United States Patent
Nishikido et al.

(10) Patent No.: US 7,616,161 B2
(45) Date of Patent: Nov. 10, 2009

(54) PORTABLE WIRELESS APPARATUS

(75) Inventors: Tomoaki Nishikido, Ishikawa (JP);
Yutaka Saito, Ishikawa (JP); Yoshio Koyanagi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 190 days.

(21) Appl. No.: 11/915,817

(22) PCT Filed: Feb. 7, 2006

(86) PCT No.: PCT/JP2006/302049

§ 371 (c)(1),
(2), (4) Date: Nov. 28, 2007

(87) PCT Pub. No.: WO2006/129400

PCT Pub. Date: Dec. 7, 2006

(65) Prior Publication Data

US 2009/0096682 A1    Apr. 16, 2009

(30) Foreign Application Priority Data

Jun. 2, 2005    (JP) .............................. 2005-162996

(51) Int. Cl.
*H01Q 1/24*    (2006.01)
(52) U.S. Cl. .................................... 343/702
(58) Field of Classification Search .................. 343/702, 343/846, 793; 455/575.1, 575.3
See application file for complete search history.

(56) References Cited

U.S. PATENT DOCUMENTS 5,554,996 A * 9/1996 Chatzipetros ............... 343/702
6,246,374 B1    6/2001 Perrotta et al.
7,102,578 B2 * 9/2006 Minemura ................... 343/702

(Continued)

FOREIGN PATENT DOCUMENTS

EP    1 258 943 A1    11/2002

(Continued)

OTHER PUBLICATIONS

Tay et al., "Dipole Configurations with Strongly Improved Radiation Efficiency for Hand-Held Transceivers", IEEE Transactions on Antennas and Propagation. vol. 46, No. 6, Jun. 1, 1998.

(Continued)

*Primary Examiner*—Hoang V Nguyen
(74) *Attorney, Agent, or Firm*—Pearne & Gordon LLP

(57)    ABSTRACT

A portable wireless apparatus has an antenna capable of resonating in frequency bands of various communication systems. The portable wireless apparatus comprises an upper case 5; a lower case 4 pivotably connected to the upper case 5; a circuit board 1 formed with wireless circuits 14 to 18 and a grounded planar conductor electrically connected to one ends of the wireless circuits 14 to 18; a planar conductor 2 provided in the upper case 5 and having a feed section electrically connected to the other ends of the wireless circuits 14 to 18; and a conductive element 3 provided in the upper case 5 and spaced from the planar conductor 2, the conductive element 3 having a length different from the length of the planar conductor 2 wherein the planar conductor 2 and the grounded planar conductor function as a dipole antenna, and the conductive element 3 functions as a parasitic element electromagnetically coupled with the dipole antenna.

6 Claims, 15 Drawing Sheets

U.S. PATENT DOCUMENTS

| | | | | |
|---|---|---|---|---|
| 7,126,545 | B2 * | 10/2006 | Nagano et al. | 343/702 |
| 7,436,364 | B2 * | 10/2008 | Nishikido et al. | 343/702 |
| 7,453,405 | B2 * | 11/2008 | Nishikido et al. | 343/702 |

FOREIGN PATENT DOCUMENTS

| | | |
|---|---|---|
| EP | 1 432 068 A2 | 12/2003 |
| EP | 1 475 858 A1 | 11/2004 |
| EP | 1 538 694 A1 | 6/2005 |
| JP | 08-191209 | 7/1996 |
| JP | 2004-056426 | 2/2004 |
| JP | 2004-208219 | 7/2004 |
| JP | 2004-228665 | 8/2004 |
| JP | 2005-192049 | 7/2005 |
| WO | 2004-010530 A | 1/2004 |

OTHER PUBLICATIONS

European Search Report dated Jan. 21, 2009.
International Search Report dated Mar. 6, 2006.

* cited by examiner

PORTABLE WIRELESS APPARATUS

This application is a 371 of PCT/JP2006/302049 dated Feb. 7, 2006.

TECHNICAL FIELD OF THE INVENTION

The present invention relates to a portable wireless apparatus, and more particularly to a portable wireless apparatus having an application for a plurality of communication systems.

BACKGROUND OF THE INVENTION

Services such as phone communications, television, position search, short-range communications, hands-free communications are provided to portable wireless apparatuses that are widely used in recent years, the portable wireless apparatuses having functions for supporting the services.

The services described above are provided in communication systems such as GPS (Global Positioning System, 1.5 GHz band), Bluetooth (2.5 GHz band) representing short-range wireless communications and digital television broadcasting (470 to 740 MHz).

Aside from the above-described communication systems, communication systems for mobile phones in Japan include PDC (Personal Digital Cellular, 800 MHz band/1.5 GHz band) and the third generation mobile communication systems (2 GHz) representing W-CDMA (Wideband Code Division Multiple Access).

Furthermore, communication systems for mobile phones in countries other than Japan include GSM (Global System for Mobile, 800 MHz band), DCS (Digital Communication System, 1.8 GHz band) and UMTS (Universal Mobile Telecommunications Systems, 2 GHz band).

If a portable wireless apparatus has an application for supporting various communication systems, it is necessary that the portable wireless apparatus have a structure with a plurality of antennas resonating in frequency bands of various communication systems.

It is known that a conventional portable wireless apparatus, which deals with the abovementioned problems, has an extendable antenna and a folding antenna connected with each other to operate over a frequency band of digital television broadcasting (refer to Japanese Patent Laid-Open Publication No. 2004-228665 (Patent Document 1)).

It is also known that an antenna device has a case with first and second conductor plates mounted therein to form a dipole feed arrangement and to thereby operate over a wide frequency band. The antenna device operates over a low frequency band since the second conductor plate has a meander shape (refer to Japanese Patent Laid-Open Publication No. 2004-208219 (Patent Document 2)).

It is known that a dipole antenna is constituted by elements different in shape from each other, as shown in FIG. 14, and provided as an unsymmetrical antenna in a foldable case to resonate over a wide frequency band as shown in FIG. 15. (refer to Non-Patent Document "Hokuriku-section Joint Convention of Institutes of Electrical Engineering in 2004, CP-41."

Patent Document 1: Japanese Patent Laid-Open Publication No. 2004-228665
Patent Document 2: Japanese Patent Laid-Open Publication No. 2004-208219
Non-Patent Document 3: Hokuriku-section Joint Convention of Institutes of Electrical Engineering in 2004, CP-41

DISCLOSURE OF THE INVENTION

Problems to be Resolved by the Invention

The portable wireless apparatus disclosed in Patent Document 1 has an antenna capable of resonating in two frequency bands of specific mobile phone communication system and television broadcasting. The antenna is, however, incapable of resonating in each frequency band of other communication systems.

When the portable wireless apparatus disclosed in Patent Document 2 is applied to a low frequency band, the device is incapable of resonating in a high frequency band of Bluetooth or other communication systems.

The portable wireless apparatus disclosed in Non-Patent Document 1 has an antenna capable of resonating in a frequency band of 0.61 GHz to 2.55 GHz. The portable wireless apparatus disclosed in Non-Patent Document 1, however, encounters such a problem that the antenna is inoperable to resonate in a frequency band of digital broadcasting system.

It is, therefore, an object of the present invention to provide a portable wireless apparatus having an antenna operable to resonate in frequency bands of various communication systems.

Means for Solving the Problems

In accordance with an aspect of the present invention, there is provided a portable wireless apparatus comprising: a first case; a second case pivotably connected to the first case; a circuit board provided in the second case, and formed with a wireless circuit and a grounded planar conductor electrically connected to one end of the wireless circuit; a planar conductor provided in the first case, and electrically connected to the other end of the wireless circuit; and a conductive element provided in the first case and spaced from the planar conductor, the conductive element being different in length from the planar conductor, wherein the planar conductor and the grounded planar conductor function as a dipole antenna, and the conductive element functions as a parasitic element electromagnetically coupled with the dipole antenna.

The portable wireless apparatus has the conductive element functioning as a parasitic element and the planar conductor functioning as a dipole antenna, the conductive element and the planar conductor being provided adjacently to each other. The planar conductor has a length different from that of the conductive element. The portable wireless apparatus thus constructed as mentioned above has an antenna capable of resonating in the frequency bands of the communication systems. The portable wireless apparatus can therefore perform wireless communications in frequency bands of communication systems.

The conductive element may have a planar shape. The planar conductor and the conductive element may be juxtaposed to each other in longitudinal direction.

The planar conductor and the conductive element may be arranged on the same plane and spaced from each other in lateral direction. The planar conductor and the conductive element may also be spaced from each other in a direction perpendicular to the longitudinal and lateral directions and in parallel relationship with each other.

The portable wireless apparatus may include: a display unit provided in the first case; the planar conductor having a surface facing a mounting surface of the display unit; and the conductive element constituted by a conductor frame surrounding the display unit.

A portable wireless apparatus according to another aspect of the present invention comprises a first case; a second case pivotably connected to the first case; a circuit board provided in the second case, and formed with a wireless circuit and a grounded planar conductor electrically connected to one end of the wireless circuit; and a planar conductor provided in the first case and having a feed section electrically connected to the other end of the wireless circuit; and a conductive element, wherein the planar conductor has an L shape with a first portion extending on the side of the feed section and a second portion perpendicular to the first portion, the width of one of the portions of the planar conductor is different from the width of the circuit board, and the planar conductor and the grounded conductor collectively function as a dipole antenna.

The portable wireless apparatus thus constructed as described above, according to the present invention, has the antenna capable of resonating in frequency bands of communication systems.

The object of the present invention is to provide a portable wireless apparatus having an antenna capable of resonating in frequency bands of communication systems.

DESCRIPTION OF REFERENCE NUMERALS

Figure 1:
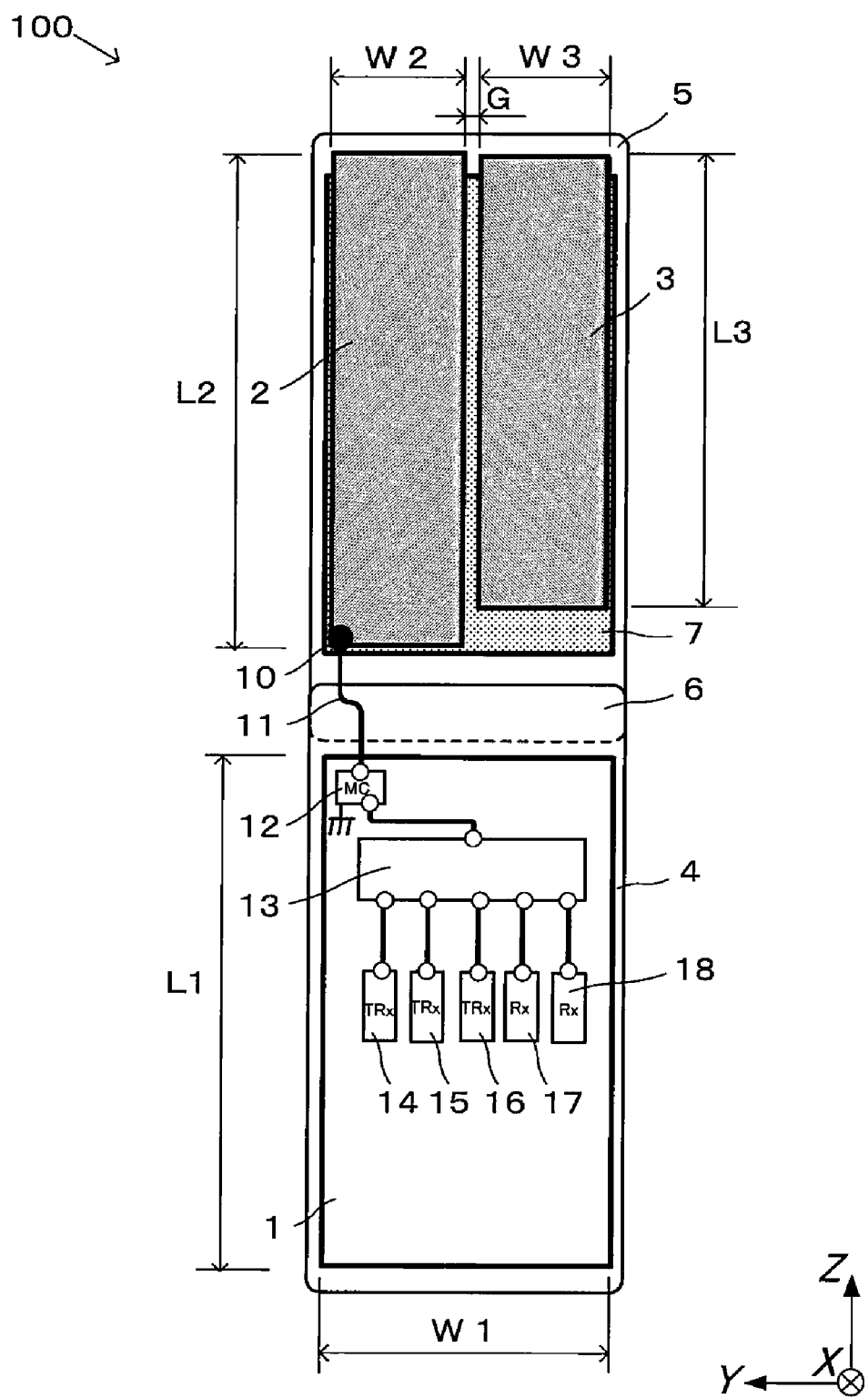
FIG. 1 is a back view of a portable wireless apparatus according to the first embodiment of the present invention.

1: Circuit board
2, 30, 80, 81: Planar conductor
3: Conductive element
4: Lower case
5: Upper case
6: Hinge
7: Display unit
10: Feed section
11: Feed line
12: Matching circuit
13: Duplexer
14, 15, 16, 17, 18: Wireless circuit
21: Conductor frame
100, 200, 300, 400: Portable wireless apparatus

BEST MODE FOR CARRYING OUT THE INVENTION

Embodiments of the portable wireless apparatus according to the present invention will be described with reference to the accompanying drawings.

First Embodiment

Figure 2:
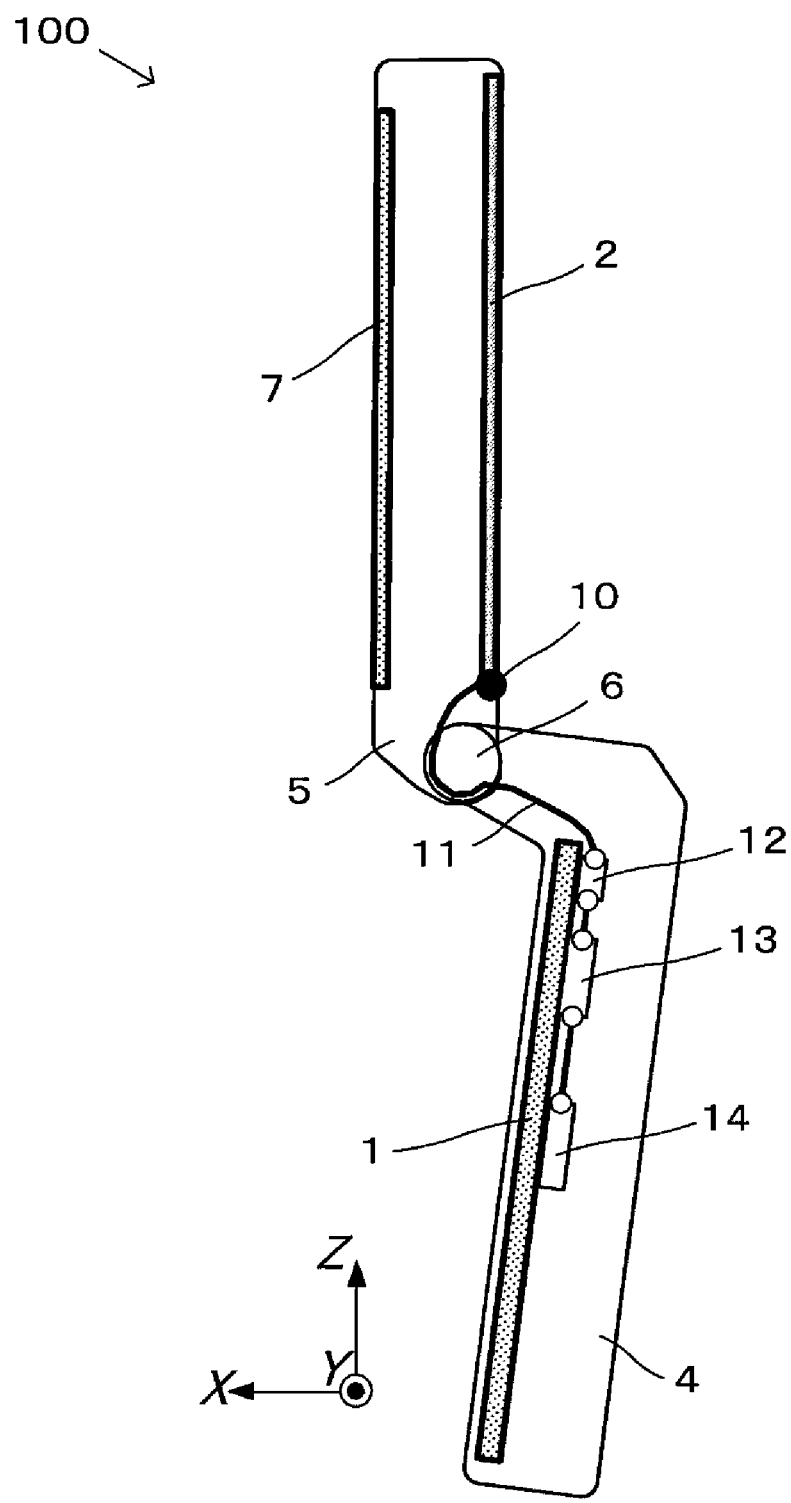
FIG. 2 is a side view of the portable wireless apparatus according to the first embodiment of the present invention.
Figure 3:
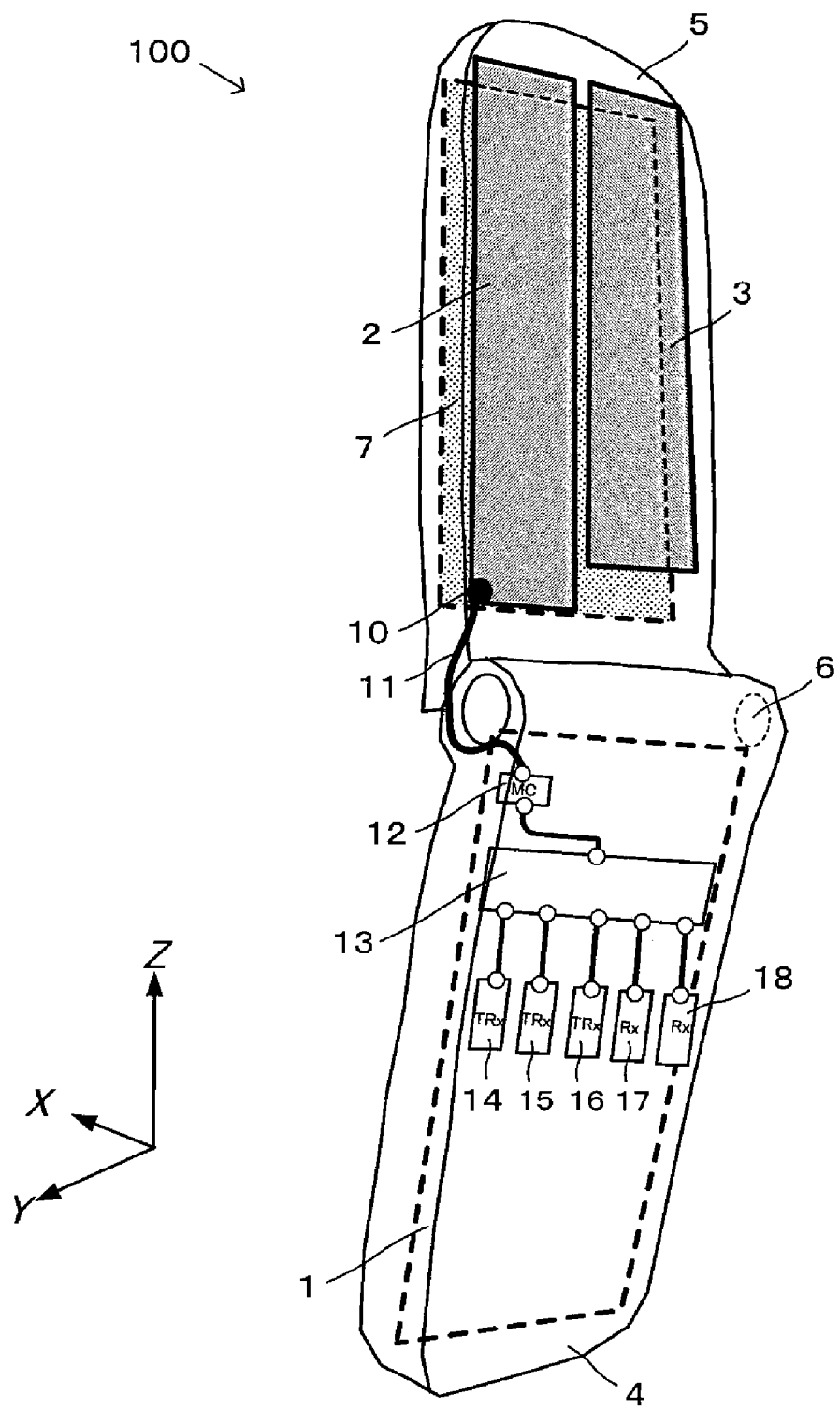
FIG. 3 is a perspective view of the portable wireless apparatus according to the first embodiment of the present invention.

FIGS. 1 to 3 are a back view, a side view and a perspective view of a portable wireless apparatus 100 according to the first embodiment of the present invention. In addition, each of FIGS. 1 to 3 shows a state in which the portable wireless apparatus 100 having a foldable structure is open.

The portable wireless apparatus 100 includes an upper case 5; a lower case 4, a hinge 6 adapted to pivotably connect the upper case 5 with the lower case 4; a circuit board 1 provided in the lower case 4; a planar conductor 2 provided in the upper case 5; a conductive element 3 provided in the upper case 5; and a display unit 7 having a liquid crystal display and provided on the upper case 5.

The upper case 5 and the lower case 4 constitute a first case and a second case according to the present invention, respectively. The upper case 5 is made of an insulating material such as resin. The lower case 4 is also made of an insulating material such as resin. Each of the upper case 5 and the lower case 4 has a length of about 120 mm and a width of about 50 mm.

The circuit board 1 has a matching circuit 12, a duplexer 13 and wireless circuits 14 to 18 mounted thereon. The circuit board 1 has a grounded planar conductor on the almost entire surface of the circuit board 1. The grounded planar conductor is adapted to apply a ground potential to each of the matching circuit 12, the duplexer 13 and wireless circuits 14 to 18. The grounded planar conductor has a length L1 of about 115 mm and a width W1 of about 45 mm.

The matching circuit 12 is designed to match with an impedance (about 50Ω) of the planar conductor 2. The duplexer 13 is constituted by a dielectric resonator and adapted to divide a received signal into signals corresponding to frequency bands.

Each of the wireless circuits 14 to 18 is adapted to supply power to the matching circuit 12 through the duplexer 13. According to the first embodiment, the wireless circuit 14 forms a PDC transmitter/receiver, and the wireless circuit 15 forms a W-CDMA transmitter/receiver. In addition, the wireless circuit 16 forms a Bluetooth transmitter/receiver, and the wireless circuit 17 forms a GPS transmitter/receiver. Furthermore, the wireless circuit 18 forms a digital television broadcasting transmitter/receiver.

The planar conductor 2 is made of a copper plate having a length L2 of about 70 mm, a width W2 of about 22 mm, and a thickness of about 0.1 mm. The planar conductor 2 is provided on an inner surface of the upper case 5, the inner surface of the upper case 5 facing a mounting surface of the display unit 7.

The planar conductor 2 has a feed section 10 electrically connected to the matching circuit 12 through a feed line 11. The feed line 11 is made of a flexible wiring material capable of being bent. The electrical connection between the feed section 10 and the matching circuit 12 can be maintained even when the lower case 4 is folded with respect to the upper case 5.

The conductive element 3 has a planar shape and is made of a copper plate having a length L3 of about 60 mm, a width W3 of about 22 mm, and a thickness of about 0.1 mm. The conductive element 3 is provided on the inner surface of the upper case 5, the inner surface of the upper case 5 facing the mounting surface of the display unit 7. The conductive element 3 and the planar conductor 2 are arranged on the same plane and with a gap of about 1 mm between the conductive element 3 and the planar conductor 2 in a Y direction (width direction). The position of the top end of the conductive element 3 in a Z direction (height direction) is the same as the position of the top end of the planar conductor 2 in the Z direction.

The planar conductor 2 and the conductive element 3 are provided in the upper case 5 having a thickness of about 7 mm so that the planar conductor 2 and the conductive element 3 do not have an adverse effect on a structure of display elements and other constituent elements, the display elements constituting the display unit 7.

The portable wireless apparatus 100 constructed as described above has the planar conductor 2, the conductive element 3, and the grounded planar conductor provided on the circuit board 1, the planar conductor 2 and the grounded planar functioning as a dipole antenna, the conductive element 3 functioning a parasitic element electromagnetically coupled with the dipole antenna.

Figure 14:
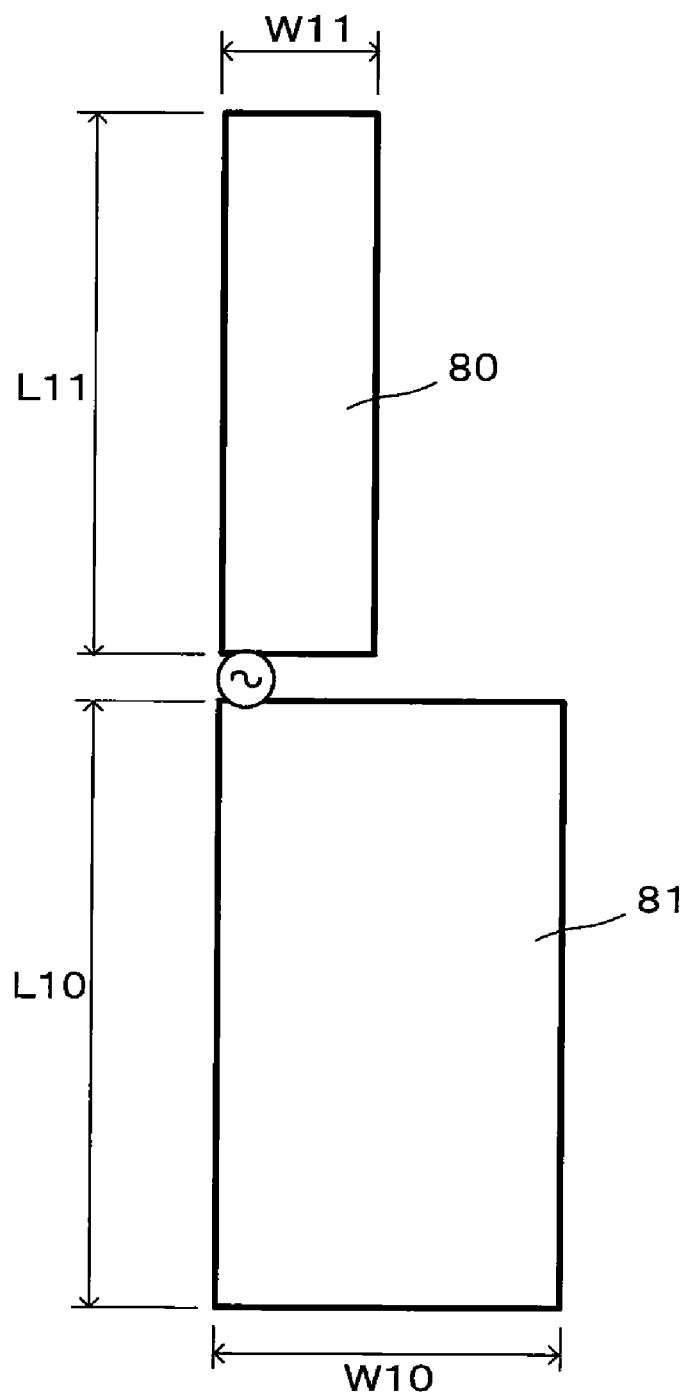
FIG. 14 is a block diagram of a conventional portable wireless apparatus.

FIG. 14 shows a conventional portable wireless apparatus having a planar conductor 80 and a planar conductor 81. The planar conductor 80 has a length L11 and a width W11. The planar conductor 81 has a length L10 and a width W10. The length L11, the width W11, the length L10, and the width W10 are designed to allow an antenna of the conventional portable wireless apparatus to resonate in three frequency bands.

The conventional portable wireless apparatus as described above is constructed so that the total of the lengths L10, L11 and the width W10 is equal to a half wavelength of the 0.7 GHz-frequency band to cause the antenna to resonate. The conventional portable wireless apparatus is constructed so that the total of the widths W10, W11 and the length L11 is equal to a half wavelength of the 1.25 GHz-frequency band to cause the antenna to resonate. In addition, the conventional portable wireless apparatus is constructed so that the total of the widths W10, W11 and the length L11 is equal to a wavelength of the 2.4 GHZ-frequency band to cause the antenna to resonate.

Figure 15:
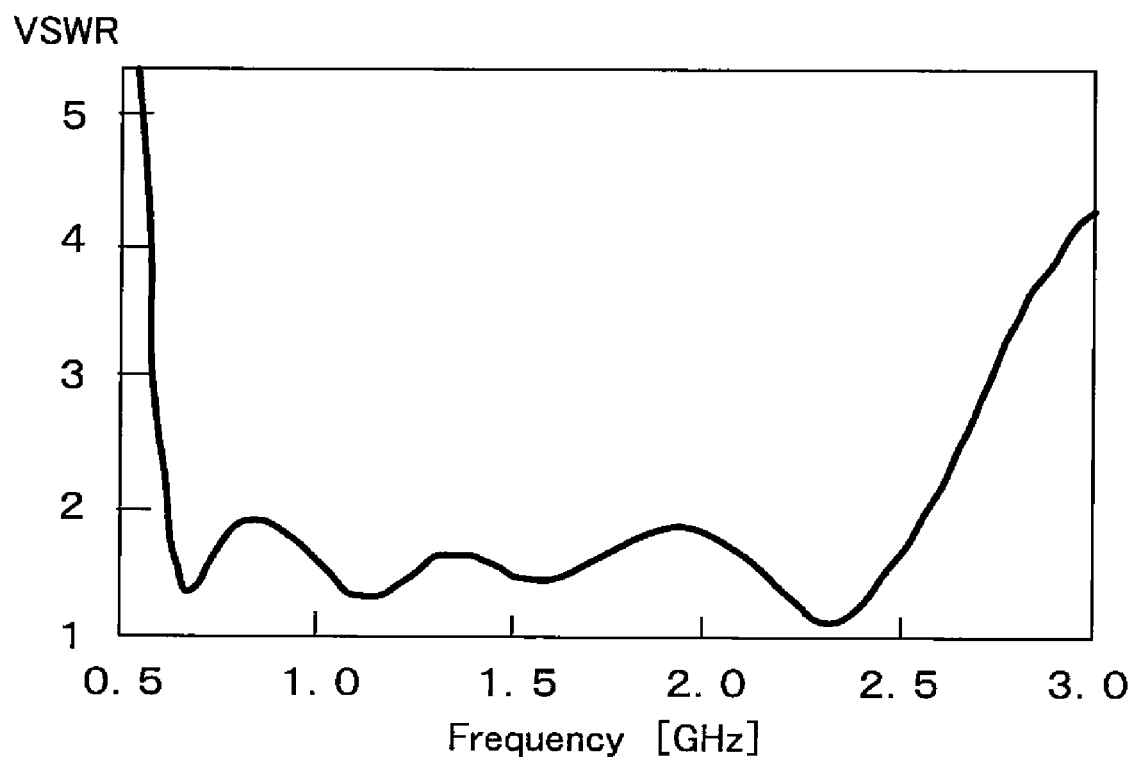
FIG. 15 is a graph showing a relationship between frequencies and VSWR characteristics of the conventional portable wireless apparatus.

The conventional portable wireless constructed as described above exhibits VSWR (Voltage Standing Wave Ratio) characteristics as shown in FIG. 15. The values of the VSMR characteristics in a wide range of 0.61 to 2.55 GHz are 2 or less.

The conventional portable wireless apparatus, however, considerably deteriorates in VSMR characteristics in a reception frequency band (470 to 740 MHz) of digital television broadcasting (hereinafter referred to as DTV). This leads to a reduction in reception sensitivity of the conventional portable wireless apparatus, resulting in the fact that the conventional portable wireless apparatus cannot obtain an excellent image.

The conventional portable wireless apparatus exhibits improved VSWR characteristics in a low frequency band when the length L11 of the planar conductor 80, the length L10 of the planar conductor 81, the width W11 of the planar conductor 80, and the width W10 of the planar conductor 81 are made longer in order to cause the antenna of the conventional portable wireless apparatus to resonate in a low frequency band of DTV. In this case, the conventional portable wireless apparatus, however, exhibits deteriorated VSWR characteristics in a high frequency band.

On the other hand, the portable wireless apparatus 100 has the conductive element 3 functioning as a parasitic element and the planar conductor 2 provided adjacently to the conductive element 3 to allow the antenna to resonate in the frequency band of DTV and the frequency band in which the conventional portable wireless apparatus is capable of operating.

If the length L2 of the planar conductor 2 is the same as the length L3 of the conductive element 3, the mutual coupling between the planar conductor 2 and the conductive element 3 is improved. This reduces a frequency band in which the antenna of the portable wireless apparatus 100 resonates. The portable wireless apparatus 100 includes the planar conductor 2 having the length L2 of 70 mm and the conductive element 3 having the length L3 of 60 mm to allow the antenna to resonate in a low frequency band. The portable wireless apparatus 100 has the antenna capable of resonating in a wide frequency band since a resonance frequency of the planar conductor 2 is different from a resonance frequency of the conductive element 3.

The portable wireless apparatus 100 is constructed so that the total of the lengths L1, L2 and the widths W2, W3 is equal to a half wavelength of the 0.6 GHz-frequency band to cause the antenna to resonate. Therefore, the portable wireless apparatus 100 has the antenna capable of resonating in a low frequency band.

Also, the portable wireless apparatus 100 is constructed so that the total of the widths W1, W2, and the length L2 is equal to a half wavelength of the 1.2 GHz-frequency band to cause the antenna to resonate in a high frequency band. In addition, the portable wireless apparatus 100 is constructed so that the total of the widths W1, W2, and the length L2 is equal to a wavelength of the 2.2 GHz-frequency band to cause the antenna to resonate.

Figure 4:
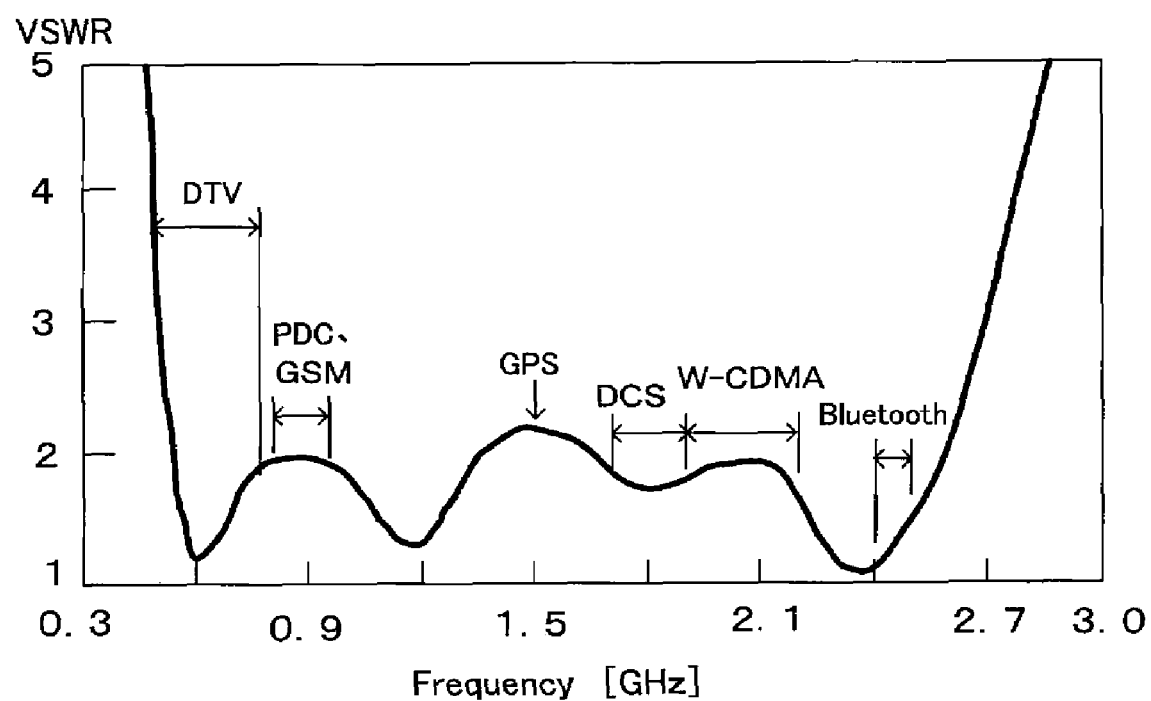
FIG. 4 is a graph showing a relationship between frequencies and voltage standing wave ratio (VSWR) characteristics of the portable wireless apparatus according to the first embodiment of the present invention.

As a result, the portable wireless apparatus 100 exhibits VSWR characteristics shown in FIG. 4. The values of the VSMR characteristics in a wide range of 0.5 to 2.6 GHz are 2.5 or less.

Accordingly, the portable wireless apparatus 100 exhibits low VSWR characteristics in a frequency band of DTV and obtains high reception sensitivity. Therefore, the portable wireless apparatus 100 can obtain an excellent image. Furthermore, the portable wireless apparatus 100 is capable of operating over a wide frequency band with almost no effect on the antenna resonating in frequency bands of other wireless communications.

The portable wireless apparatus 100 has the planar conductive element 3 functioning as a parasitic element and the planar conductor 2 functioning as the dipole antenna, the conductive element 3 and the planar conductor 2 being provided adjacently to each other. The plate conductor 2 has the length L2 different from the length L3 of the conductive element 3. The portable wireless apparatus 100 constructed as described above exhibits excellent VSWR characteristics in a wide frequency band of communication applications. The portable wireless apparatus 100 has a structure with an antenna capable of resonating in frequency bands of various communication systems.

The conventional portable wireless apparatus disclosed in Patent Document 1 has built-in parts spaced from its antenna with a gap of 5 mm or more in order to ensure a bandwidth and a gain. This configuration increases the size of the conventional portable wireless apparatus. On the other hand, the portable wireless apparatus 100 has the planar conductor 2 and the conductive element 3 which are attached to the inner surface of the upper case 5, resulting in a reduction in the size of the portable wireless apparatus 100.

Second Embodiment

Figure 5:
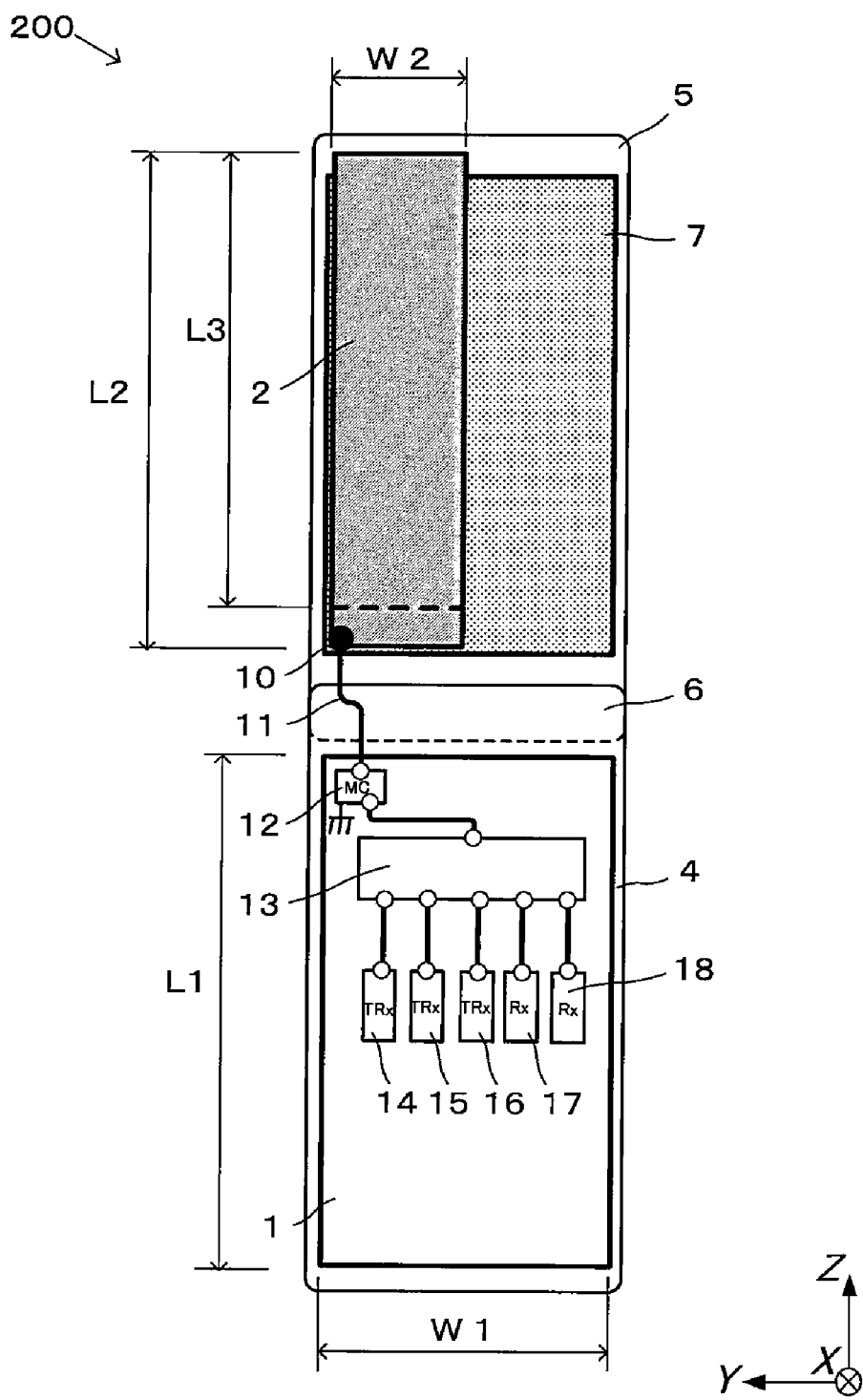
FIG. 5 is a back view of a portable wireless apparatus according to the second embodiment of the present invention.
Figure 6:
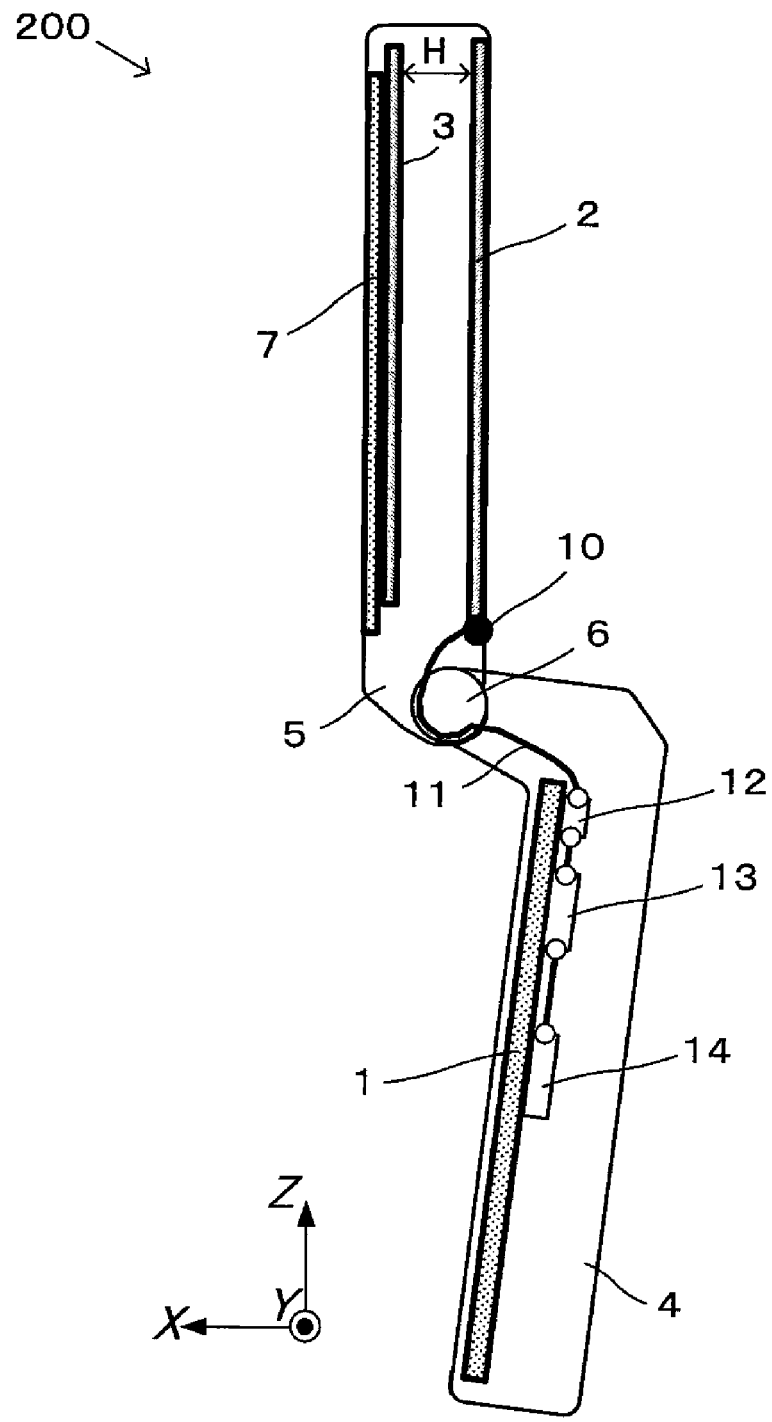
FIG. 6 is a side view of the portable wireless apparatus according to the second embodiment of the present invention.
Figure 7:
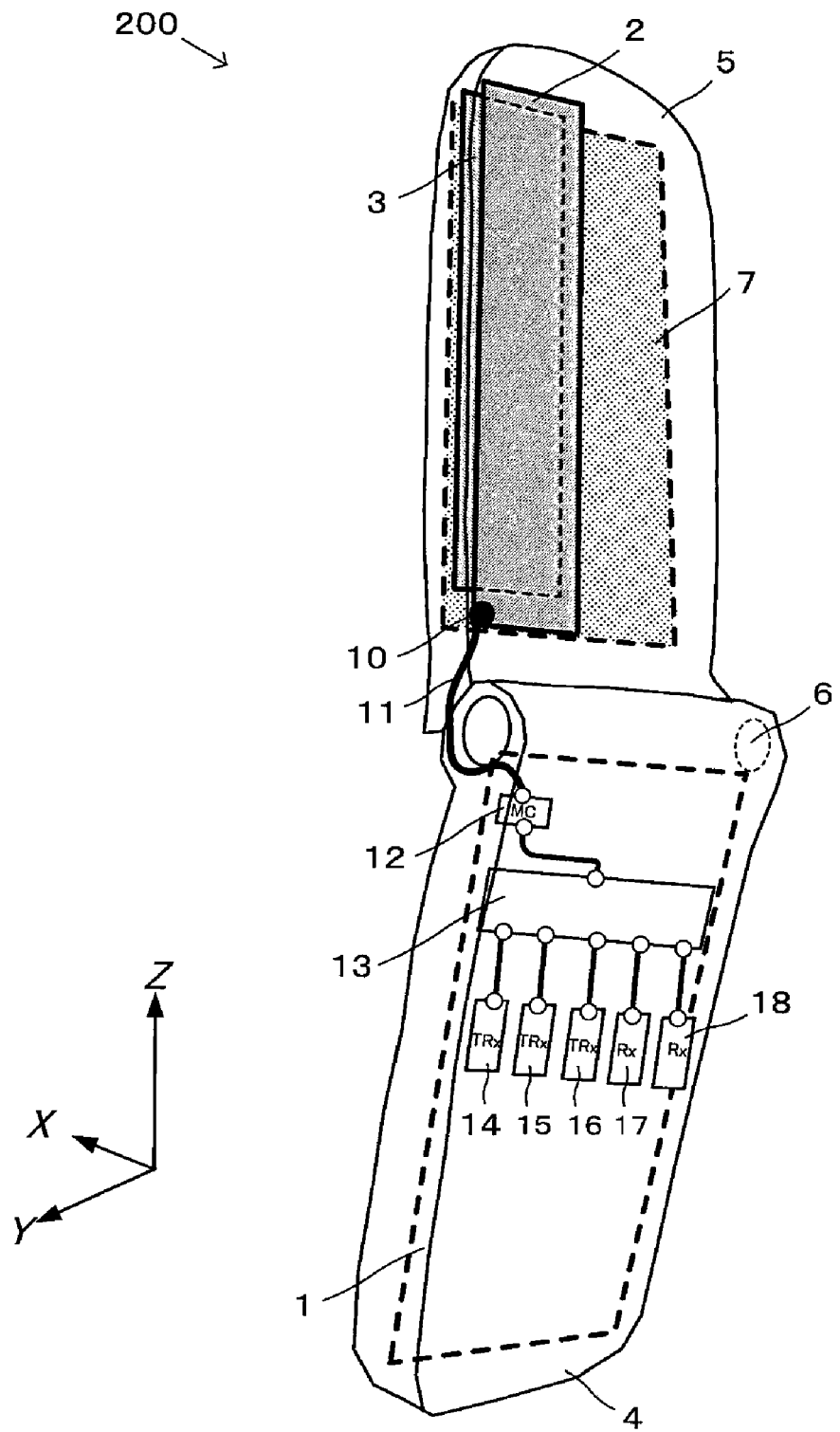
FIG. 7 is a perspective view of the portable wireless apparatus according to the second embodiment of the present invention.

FIGS. 5 to 7 show a portable wireless apparatus 200 according to a second embodiment of the present invention. The same reference numerals shown in FIGS. 5 to 7 denote the same elements constituting the portable wireless apparatus 100 according to the first embodiment as shown in FIGS. 1 to 3, and description thereof will be omitted.

FIGS. 5 to 7 are a back view, a side view, and a perspective view of the portable wireless apparatus 200 according to the second embodiment of the present invention. Each of FIGS. 5 to 7 shows the state in which the portable wireless apparatus 200 having a foldable structure is open.

The portable wireless apparatus 200 is different from the portable wireless apparatus 100 according to the first embodiment in that the position of the conductive element 3.

The conductive element 3 is provided in the upper case 5 and arranged along the mounting surface of the display unit 7. The conductive element 3 is arranged in parallel relationship with the planar conductor 2 with a gap H of about 5 mm in an X direction as shown in FIGS. 5 to 7.

The planar conductor 2 and the conductive element 3 are provided in the upper case 5 having a thickness of about 7 mm. The planar conductor 2 and the conductive element 3 do not have an adverse effect on a structure of display elements and other constituent elements, the display elements constituting the display unit 7.

The portable wireless apparatus 200 thus constructed as described above has the conductive element 3 functioning as a parasitic element electromagnetically coupled with a dipole antenna. The dipole antenna is composed of the planar conductor 2 and the grounded planar conductor provided on the circuit board 1.

According to the second embodiment, the conductive element 3 functioning as a parasitic element is provided adjacently to the planar conductor 2 to allow the antenna to resonate in a frequency band of DTV and the frequency band in which the conventional portable wireless apparatus is capable of operating.

The mutual coupling between the planar conductor 2 and the conductive element 3 is increased under the condition that the length L2 of the planar conductor 2 is the same as the length L3 of the conductive element 3. This reduces a frequency band in which the antenna of the portable wireless apparatus 200 resonates. The portable wireless apparatus 200 includes the planar conductor 2 having the length L2 of 70 mm and the conductive element 3 having the length L3 of 60 mm to allow the antenna to resonate in a low frequency band. The portable wireless apparatus 200 has the antenna capable of resonating in four frequency bands, that is, a wide frequency band, since a resonance frequency of the planar conductor 2 is different from a resonance frequency of the conductive element 3.

The portable wireless apparatus 200 is constructed so that the total of the lengths L1, L2 and the widths W2, W3 is equal to a half wavelength of the 0.6 GHz-frequency band to cause the antenna to resonate in a low frequency band. Also, the portable wireless apparatus 200 is constructed so that the total of the widths W1, W2, and the length L2 is equal to a half wavelength of the 1.2 GHz-frequency band to cause the antenna to resonate in a high frequency band.

The portable wireless apparatus 200 is constructed so that the total of the width W2 and the length L2 is equal to a half wavelength of the 1.9 GHz-frequency band to cause the antenna to resonate. Also, the portable wireless apparatus 200 is constructed so that the total of the widths W1, W2 and the length L2 is equal to a wavelength of the 2.2 GHz-frequency band to cause the antenna to resonate.

Figure 8:
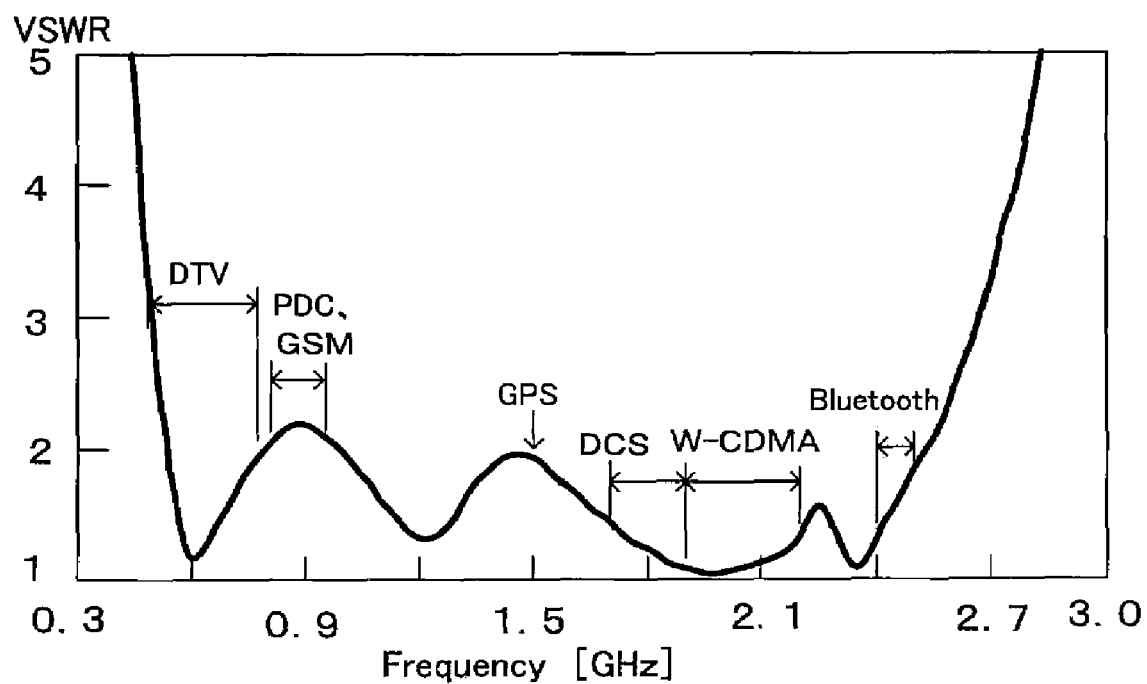
FIG. 8 is a graph showing a relationship between frequencies and VSWR characteristics of the portable wireless apparatus according to the second embodiment of the present invention.

Accordingly, the portable wireless apparatus 200 exhibits VSWR characteristics shown in FIG. 8. The values of the VSWR characteristics in a range of frequencies of 0.5 GHz to 2.6 GHz are 2.5 or less.

The portable wireless apparatus 200 exhibits low VSWR characteristics in a frequency band of DTV and obtains high reception sensitivity. Therefore, the portable wireless apparatus 200 can obtain an excellent image. In addition, the portable wireless apparatus 200 is capable of operating over a wide frequency band with almost no effect on the antenna resonating in frequency bands of other wireless communications.

The portable wireless apparatus 200 has the conductive element 3 functioning as a parasitic element and the planar conductor 2 functioning as the dipole antenna, the planar conductor 2 and the conductive element 3 being provided adjacently to each other. The plate conductor 2 has the length L2 different from the length L3 of the conductive element 3. The portable wireless apparatus 200 constructed as described above exhibits excellent VSWR characteristics in a wide frequency band of various communication applications. In addition, the portable wireless apparatus 200 has a structure with an antenna capable of resonating in frequency bands of various communication systems.

The conventional portable wireless apparatus disclosed in Patent Document 1 has the built-in parts spaced from the antenna with a gap of 5 mm or more in order to ensure a bandwidth and a gain. This configuration increases the size of the conventional portable wireless apparatus. On the other hand, the portable wireless apparatus 200 has the planar conductor 2 and the conductive element 3 which are attached to the inner surface of the upper case 5, resulting in a reduction in the size of the portable wireless apparatus 200.

Third Embodiment

Figure 9:
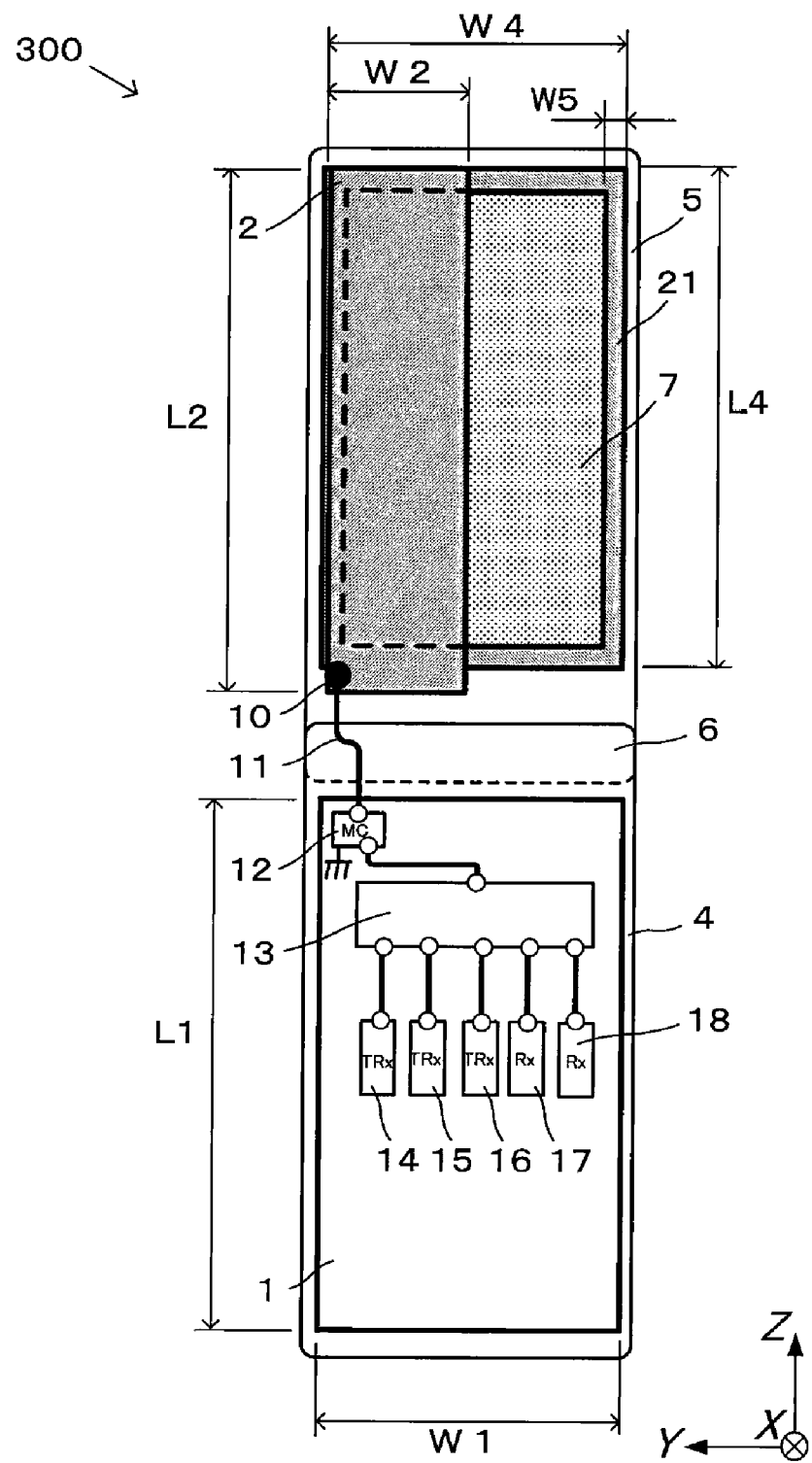
FIG. 9 is a back view of a portable wireless apparatus according to the third embodiment of the present invention.
Figure 10:
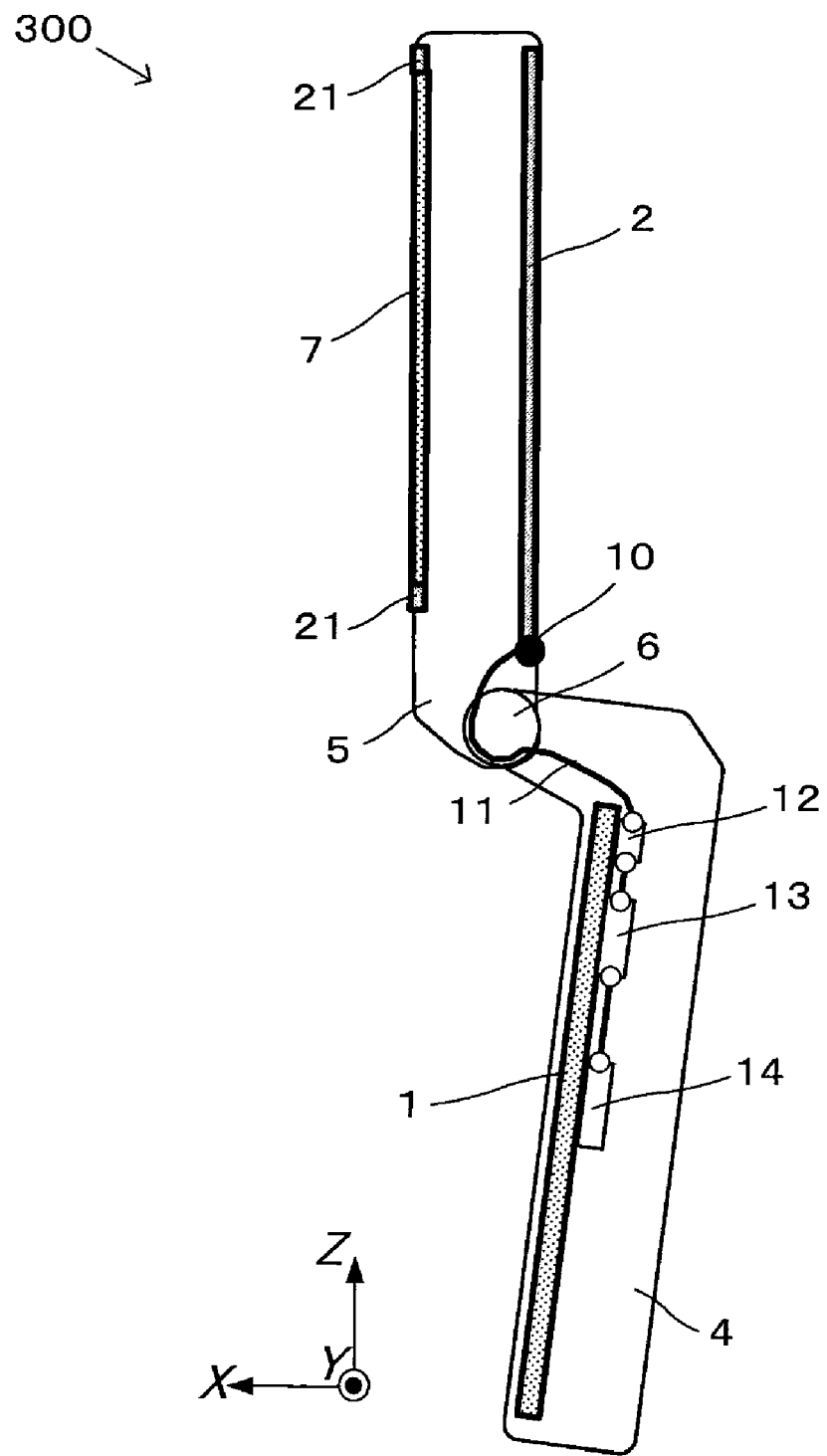
FIG. 10 is a side view of the portable wireless apparatus according to the third embodiment of the present invention.

FIGS. 9 and 10 each show a portable wireless apparatus 300 according to a third embodiment of the present invention. The same reference numerals shown in FIGS. 9 and 10 denote the same elements constituting the portable wireless apparatus 100 according to the first embodiment as shown in FIGS. 1 to 3, and description thereof will be omitted.

FIGS. 9 and 10 are a back view and a side view of the portable wireless apparatus 300 and each show the state in which the portable wireless apparatus 300 having a foldable structure is open.

The portable wireless apparatus 300 is different from the portable wireless apparatus 100 according to the first embodiment in that the portable wireless apparatus 300 includes a conductor frame 21 in place of the conductive element 3.

The conductor frame 21 is made of metal and has a first length L4 of about 60 mm, a second length W4 of about 45 mm, a frame width W5 of about 3 mm, and a thickness of about 1 mm. The conductor frame 21 is provided in the upper case 5 to surround and fix the display unit 7.

The planar conductor 2 and the conductor frame 21 are provided in the upper case 5 having a thickness of about 7 mm. The planar conductor 2 and the conductor frame 21 do not have an adverse effect on a structure of display elements and other constituent elements, the display elements constituting the display unit 7.

The portable wireless apparatus 300 thus constructed as described above has the conductor frame 21 functioning as a parasitic element electromagnetically coupled with a dipole antenna composed of the planar conductor 2 and the grounded planar conductor provided on the circuit board 1.

According to the second embodiment, the conductor frame 21 for fixing the display unit 7 functions as a parasitic element and is provided adjacently to the planar conductor 2 to allow the antenna to resonate in the frequency band of DTV and the frequency band in which the conventional portable wireless apparatus is capable of operating.

If the length L2 of the planar conductor 2 is the same as the first length of L4 of the conductor frame 21, the mutual coupling between the planar conductor 2 and the conductor frame 21 is increased. This reduces a frequency band in which the antenna of the portable wireless apparatus 300 resonates. The portable wireless apparatus 300 includes the planar conductor 2 having the length L2 of 70 mm and the conductor frame 21 having the first length of L4 of 60 mm to allow the antenna to resonate in a low frequency band. The portable wireless apparatus 300 has the antenna capable of resonating in three frequency bands, that is, a wide frequency band, since a resonance frequency of the planar conductor 2 is different from a resonance frequency of the conductor frame 21.

The portable wireless apparatus 300 is constructed so that the total of the lengths L1, L2, and the width W4 is equal to a half wavelength of the 0.6 GHz-frequency band to cause the antenna to resonate in a low frequency band. Also, the portable wireless apparatus 300 is constructed so that the total of the width W4 and the length L2 is equal to a half wavelength of the 1.2 GHz-frequency band to cause the antenna to resonate in a high frequency band.

In addition, the portable wireless apparatus 300 is constructed so that the total of the width W4 and the length L2 is equal to a wavelength of the 2.4 GHz frequency-band to cause the antenna to resonate.

Accordingly, the portable wireless apparatus 300 exhibits VSWR characteristics substantially same as those shown in FIG. 4. The values of the VSWR characteristics in a range of frequencies of 0.5 GHz to 2.6 GHz are 2.5 or less.

The portable wireless apparatus 300 exhibits low VSWR characteristics in a frequency band of DTV and obtains high reception sensitivity. Therefore, the portable wireless apparatus 300 can obtain an excellent image. In addition, the portable wireless apparatus 300 is capable of operating over a wide frequency band with almost no effect on the antenna resonating in frequency bands of other wireless communications.

The portable wireless apparatus 300 has the conductor frame 21 functioning as a parasitic element and the planar conductor 2 functioning as the dipole antenna, the conductor frame 21 and the planar conductor 2 being provided adjacently to each other. The plate conductor 2 has the length L2 different from the first length L4 of the conductor frame 21. The portable wireless apparatus 300 constructed as described above exhibits excellent VSWR characteristics in a wide frequency band for various communication applications. In addition, the portable wireless apparatus 300 has a structure with an antenna capable of resonating in frequency bands of various communication systems.

The conventional portable wireless apparatus disclosed in Patent Document 1 has the built-in parts spaced from the antenna with a gap of 5 mm or more in order to ensure a bandwidth and a gain. This configuration increases the size of the conventional portable wireless apparatus. On the other hand, the portable wireless apparatus 300 has the planar conductor 2 and the conductor frame 21 which are attached to the inner surface of the upper case 5, resulting in a reduction in the size of the portable wireless apparatus 300.

Fourth Embodiment

Figure 11:
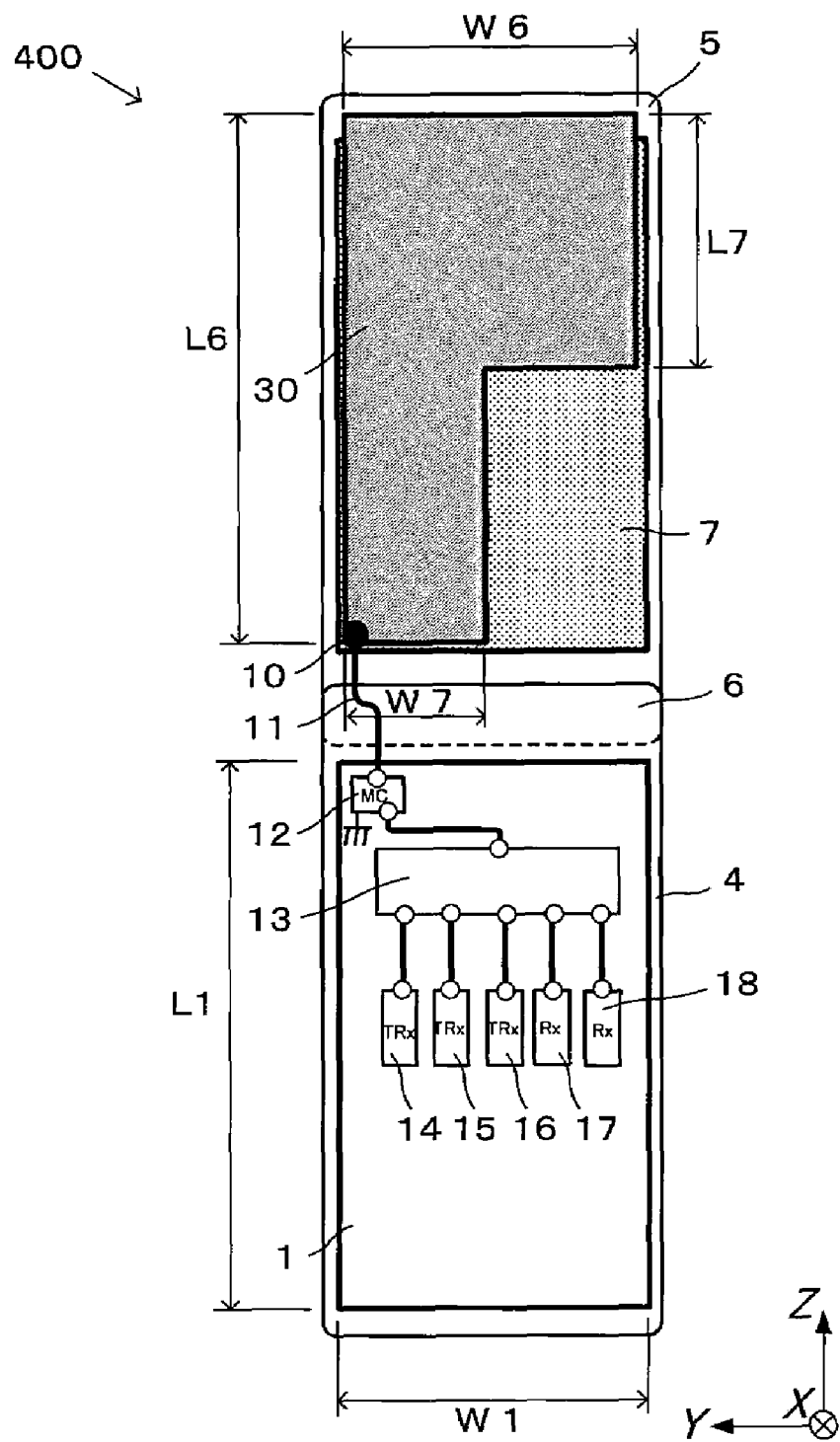
FIG. 11 is a back view of a portable wireless apparatus according to the fourth embodiment of the present invention.
Figure 12:
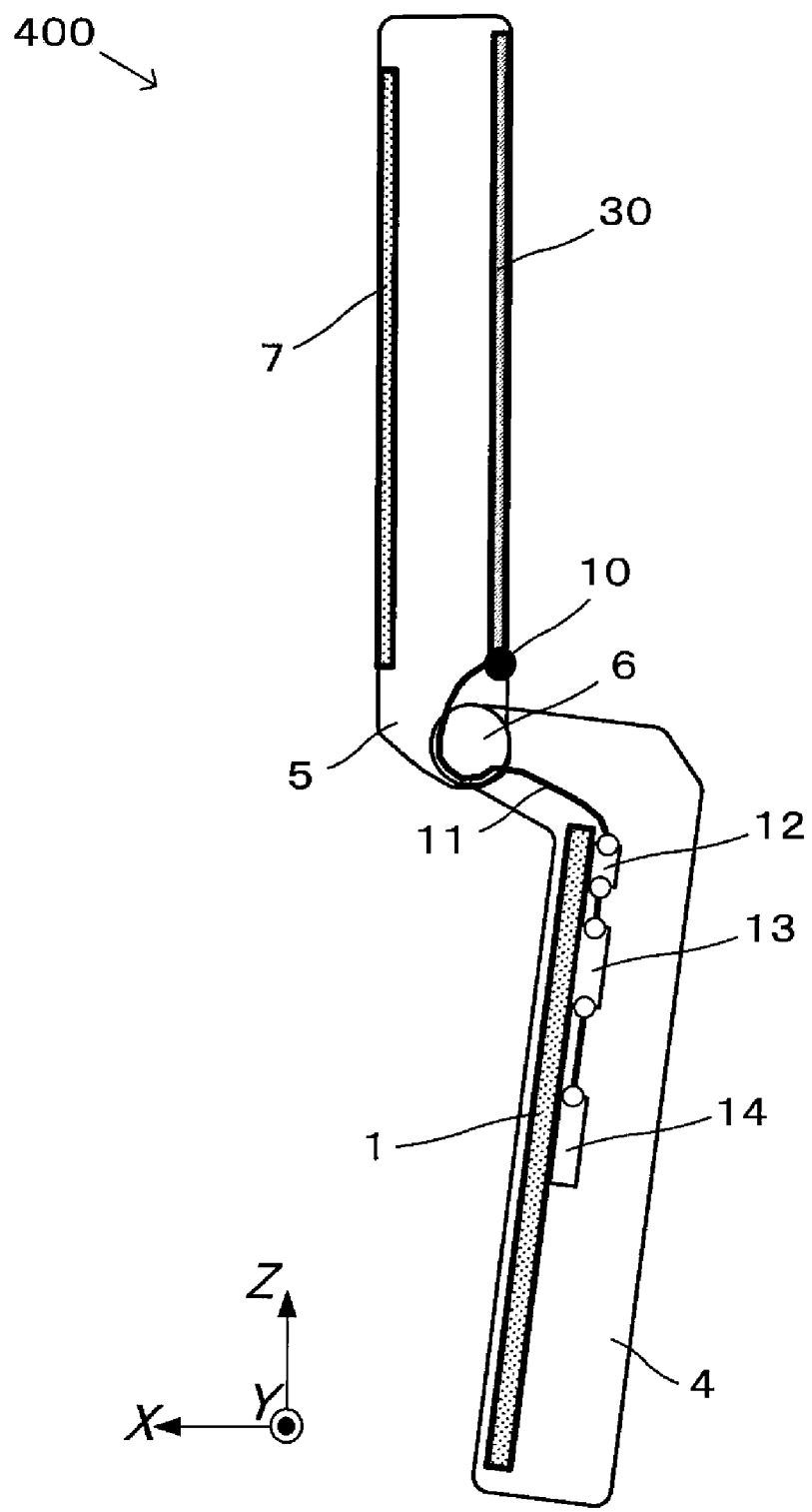
FIG. 12 is a side view of the portable wireless apparatus according to the fourth embodiment of the present invention.

FIGS. 11 and 12 each show a portable wireless apparatus 400 according to a fourth embodiment of the present invention. The same reference numerals shown in FIGS. 11 and 12 denote the same elements constituting the portable wireless apparatus 100 according to the first embodiment as shown in FIGS. 1 to 3, and description thereof will be omitted.

FIGS. 11 and 12 are a back view and a side view of the portable wireless apparatus 400 and each show the state in which the portable wireless apparatus 400 having a foldable structure is open.

The portable wireless apparatus 400 is different from the portable wireless apparatus 100 according to the first embodiment in that the portable wireless apparatus 400 has a planar conductor 30 in place of the planar conductor 2 and the conductive element 3.

The planar conductor 30 has an L shape and has a length L6 of about 70 mm, a length L7 of about 40 mm, a width W6 of about 45 mm, a width W7 of about 22 mm, and a thickness of about 0.1 mm. The planar conductor 30 is made of a copper plate. The planar conductor 30 is attached to the inner surface of the upper case 5, the inner surface facing the mounting surface of the display unit 7.

The planar conductor 30 has one end defined as the feed section 10 and is electrically connected to the matching circuit 12 through the feed line 11.

The planar conductor 30 is provided in the upper case 5 having a thickness of about 7 mm. The planar conductor 30 does not have an adverse effect on a structure of display elements and other constituent elements, the display elements constituting the display unit 7.

The portable wireless apparatus 400 thus constructed as described above has the planar conductor 30 and the grounded planar conductor provided on the circuit board 1. The planar conductor 30 and the grounded planar conductor function as a dipole antenna.

According to the fourth embodiment, the portable wireless apparatus 400 includes the planar conductor 30 having the two different widths W7 and W6 and the lengths L6 and L7 adjusted in order to allow the antenna to resonate in the frequency band of DTV and the frequency band in which the conventional portable wireless apparatus is capable of operating.

In the portable wireless apparatus 400, the planar conductor 30 has the different lengths L6 of 70 mm and L7 of 40 mm to cause the antenna to resonate in three frequency bands. Therefore, the portable wireless apparatus 400 operates over a wide frequency band.

The portable wireless apparatus 400 is constructed so that the total of the lengths L1, L6 and the width W6 is equal to a half wavelength of the 0.6 GHz frequency-band to cause the antenna to resonate in a low frequency band. Also, the portable wireless apparatus 400 is constructed so that the total of the widths W7, W6 and the length L6 is equal to a half wavelength of the 1.2 GHz-frequency band to cause the antenna to resonate in a high frequency band.

Furthermore, the portable wireless apparatus 400 is constructed so that the total of the widths W7, W6 and the length L6 is equal to a wavelength of the 2.2 GHz-frequency band to cause the antenna to resonate. The portable wireless apparatus 400 is constructed so that the total of the lengths L6, L7 and the width W7 is equal to a wavelength of the 2.3 GHz-frequency band to cause the antenna to resonate. Therefore, the portable wireless apparatus 400 has the antenna capable of resonating in a wide frequency band around 2.2 GHz, and thus obtains high reception sensitivity.

Figure 13:
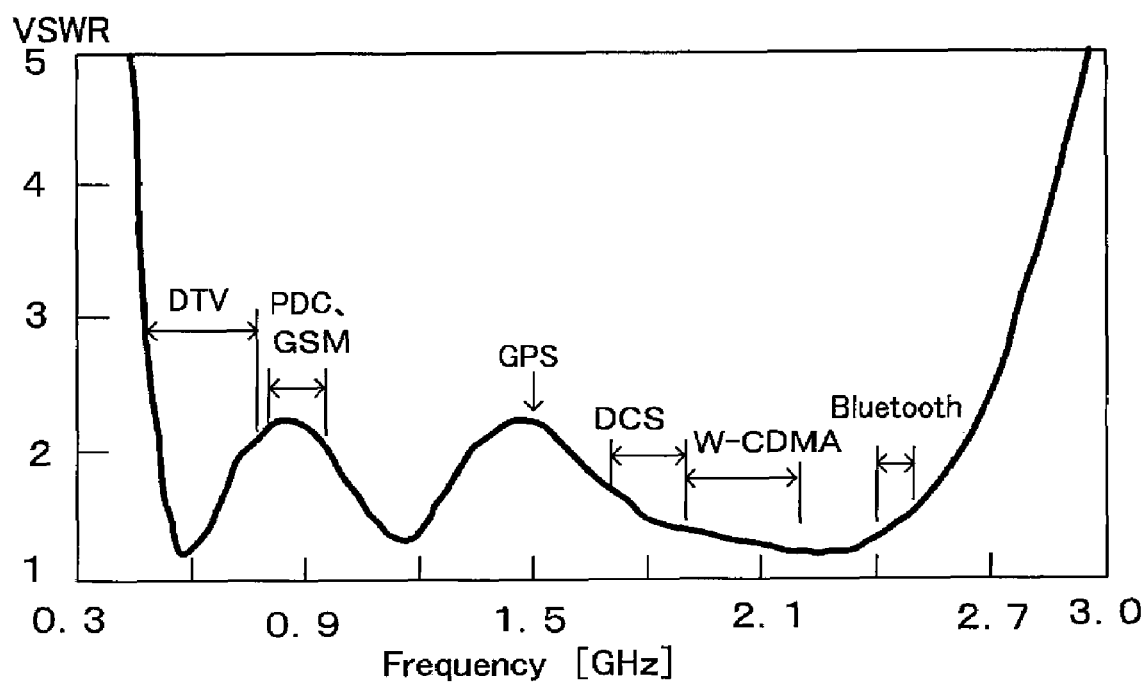
FIG. 13 is a graph showing a relationship between frequencies and VSWR characteristics of the portable wireless apparatus according to the fourth embodiment of the present invention.

The portable wireless apparatus 400 exhibits VSWR characteristics shown in FIG. 13. The values of the VSWR characteristics in a wide frequency band of 0.5 GHz to 2.7 GHz are 2.5 or less.

Accordingly, the portable wireless apparatus 400 exhibits low VSWR characteristics in a frequency band of DTV and obtains high reception sensitivity. The portable wireless apparatus 400 can therefore obtain an excellent image. Furthermore, the portable wireless apparatus 400 is capable of operating over a wide frequency band with almost no effect on the antenna resonating in frequency bands of other wireless communications.

Since the planar conductor 30 of the portable wireless apparatus 400 has an L shape, the portable wireless apparatus 400 exhibits excellent VSWR characteristics in a wide frequency band for various communication applications. The portable wireless apparatus 400 has a structure with an antenna capable of resonating in frequency bands of various communication systems.

The conventional portable wireless apparatus disclosed in Patent Document 1 has the built-in parts spaced from the antenna with a gap of 5 mm or more in order to ensure a bandwidth and a gain. This configuration increases the size of the conventional device. On the other hand, the portable wireless apparatus 400 has the planar conductor 30 attached to the inner surface of the upper case 5, resulting in a reduction in the size of the portable wireless apparatus 400.

INDUSTRIAL APPLICABILITY

As described above, the portable wireless apparatuses according to the present invention each have an antenna capable of resonating in frequency bands of various communication systems. The portable wireless apparatuses according to the present invention are useful, for example, as a portable wireless apparatus having application functions for a plurality of communication systems.

What is claimed is:

1. A portable wireless apparatus comprising:
a first case;
a second case pivotably connected to said first case;
a circuit board provided in said second case, and formed with a wireless circuit and a grounded planar conductor electrically connected to one end of said wireless circuit;
a planar conductor provided in said first case and electrically connected to said other end of said wireless circuit; and
a conductive element provided in said first case and spaced from said planar conductor, said conductive element having a length different from a length of said planar conductor, wherein
said planar conductor and said grounded planar conductor function as a dipole antenna, and
said conductive element functions as a parasitic element electromagnetically coupled with said dipole antenna.

2. A portable wireless apparatus as set forth in claim 1, wherein
said conductive element has a planar shape, and
said conductive element and said planar conductor are juxtaposed to each other in a longitudinal direction of said conductive element.

3. A portable wireless apparatus as set forth in claim 2, wherein
said planar conductor and said conductive element are arranged on said same plane and spaced from each other in a lateral direction of said conductive element.

4. A portable wireless apparatus as set forth in claim 2, wherein
said planar conductor and said conductive element are in parallel relationship with and spaced from each other in a direction perpendicular to said longitudinal and lateral directions.

5. A portable wireless apparatus as set forth in claim 1, comprising a display unit provided on said first case, wherein
said planar conductor having a surface facing a mounting surface of said display unit, and
said conductive element constituted by a conductor frame surrounding said display unit.

6. A portable wireless apparatus comprising:
a first case;
a second case pivotably connected to said first case;
a circuit board formed with a wireless circuit and a grounded planar conductor electrically connected to one end of said wireless circuit; and
a planar conductor provided in said first case and having a feed section electrically connected to the other end of said wireless circuit, wherein
said planar conductor has an L shape and has a first portion extending on the side of said feed section and a second portion perpendicular to said first portion,
the width of one of said portions of said planar conductor is different from the width of the circuit board, and
said planar conductor and said grounded planar conductor function as a dipole antenna.

* * * * *